Aug. 18, 1970  C. H. KIRK, JR  3,524,475
EXPANSION TANK
Filed Jan. 10, 1968

INVENTOR
CHESTER H. KIRK, Jr.
BY
Brumbaugh, Free, Graves & Donohue
HIS ATTORNEYS

United States Patent Office 3,524,475
Patented Aug. 18, 1970

3,524,475
EXPANSION TANK
Chester H. Kirk, Jr., Warwick, R.I., assignor to American Tube and Controls Incorporated, West Warwick, R.I., a corporation of Rhode Island
Filed Jan. 10, 1968, Ser. No. 696,853
Int. Cl. F16l 55/04
U.S. Cl. 138—30                    11 Claims

ABSTRACT OF THE DISCLOSURE

An expansion tank the interior of which is divided by a flexible diaphragm into two sections, one of the sections adapted to be precharged by gas under pressure and the other section adapted to receive a liquid, a liner covering the interior surfaces of the portion of the tank defining the liquid-containing section, so that the liquid is contained between the diaphragm and the liner.

---

This invention relates to expansion tanks and, more particularly, to improved expansion tanks adapted to form part of a hot water heating system or a pressurized water system.

The present invention is an improvement over the expansion tank disclosed in my U.S. Pat. No. 3,035,614, granted May 22, 1962. My earlier expansion tank was provided with a deformable diaphragm to divide the tank into two sections. One section is precharged with gas under pressure so that the diaphragm is displaced to increase or decrease the volume of this section according to the variations of the volume of water in the other section. When the expansion tank is incorporated in a hot water heating system, the variation in volume is caused when the boiler water is heated and cooled in the normal cyclic operation of the heating system. If the expansion tank is a part of a water system, the variation in volume occurs as tap water is drawn and when the pump operates to replace the water drawn from the tank. The diaphragm separates the gas in the one section of the tank from the water in the system, thereby eliminating the drawbacks of prior art heating systems or other water systems which result from the absorption of air in the water.

There is a corrosion problem which significantly limits the useful life of any of the prior art expansion tanks. This is due to the contact of water (or water vapor) with substantially the entire inner surface of the water-receiving section of the earlier expansion tanks. Corrosion is active in hot water heating system expansion tanks, because of the elevated temperature of the water. With water system expansion tanks, the corrosion varies in accordance with the mineral content of the water in a given locality.

In accordance with the present invention, I have provided an expansion tank of the diaphragm type in which the inner surface of the portion of the tank defining the water-receiving section is covered with a water impervious liner. The liner itself is fabricated in a separate operation before being installed in the tank. This permits the manufacture of a liner of the desired quality and thickness at a considerable saving as compared with a liner formed on the interior tank surface by a coating process. It would be difficult and expensive both to apply a liner coating as well as to determine whether the deposited liner is of the desired thickness and integrity.

The water is thus contained between the liner and the diaphragm so that the entire interior of the expansion tank is shielded from the water. As a result, corrosion of the tank is prevented regardless of the type of water with which the tank is used or of the temperature experienced within the practical limits of operation of hot water heating systems. This permits the tank to be constructed of any desired material, without regard to the effect of water on that material.

Figure 1:
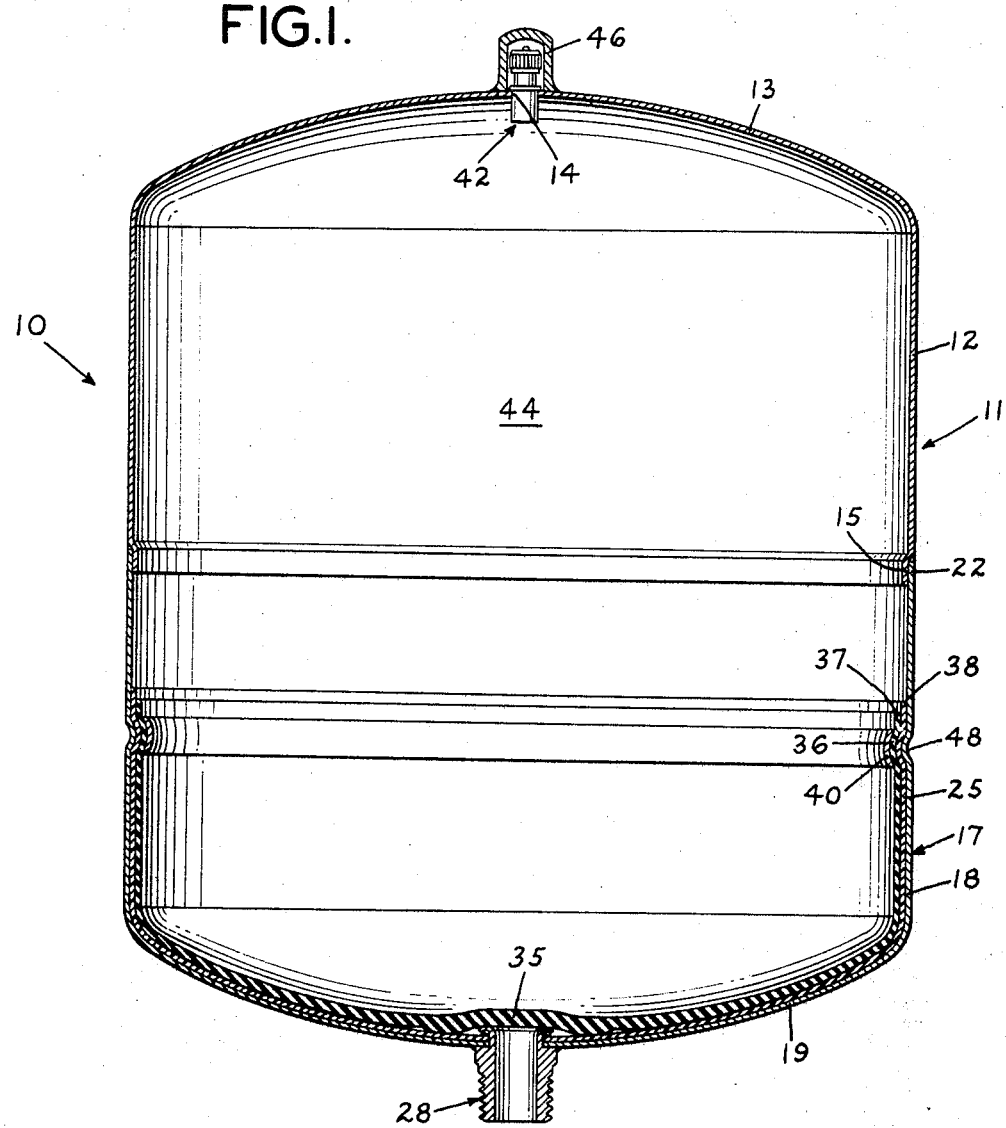
Figure 2:
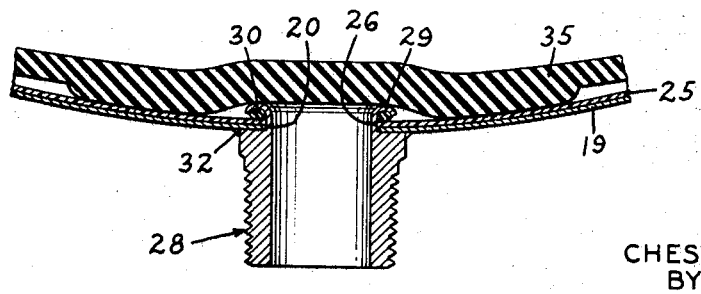

For a better understanding of the present invention, reference may be had to the accompanying drawings, in which:

FIG. 1 is a vertical sectional view of a typical expansion tank embodying the present invention; and FIG. 2 is an enlarged sectional view of a portion of the expansion tank of FIG. 1.

As shown in FIGS. 1 and 2, a typical expansion tank 10 according to the invention includes an upper cylindrical body 11 formed with a sidewall 12 and an end wall 13 which is provided with an orifice 14. The sidewall 12 terminates at its open end with an offset edge 15. A lower cylindrical body 17 is formed with a sidewall 18 and an end wall 19 which is provided with an orifice 20. The open end edge 22 of the lower sidewall 18 is secured to the offset edge 15 of the upper sidewall 12 by welding, brazing or soldering to form the completed tank as described in my Pat. No. 3,035,614.

The interior surface of the lower end wall 19 and of the lower portion of the lower side wall 18 are covered by a liquid-impervious liner 25, which is composed preferably of a plastic capable of withstanding temperatures of at least 212° F., such as polyethylene, for example, so that the water of a hot water heating system or a pressurized well water system is separated from the interior surfaces of the portion of the tank defining the bottom section thereof, this being the section that contains the water. Also, the plastic liner will not deteriorate due to the temperature or type of water with which the tank is used. The liner itself is manufactured by any suitable technique known to the art, such as vacuum forming, molding, etc.

The plastic liner 25 is formed with an orifice 26 which is disposed substantially coterminous with the orifice 20 in the end wall 19 of the lower cylindrical body (see FIG. 2). The portion of the liner adjacent the orifice 26 is clamped to the lower end wall 19 by means of a threaded tank fitting 28, welded, brazed or otherwise suitably connected to the tank at 32 and adapted to connect the expansion tank 10 with the water system of which it forms a part. The fitting 28 is formed with an upwardly extending lip 29, which is adapted to be rolled over to clamp an O-ring seal 30, which is preferably of an elastomeric material such as rubber. The O-ring is compressed between the lip 29 and the liner 25, and provides a liquid-tight seal therebetween, thus preventing water in the expansion tank from escaping through the orifice 26 of the plastic liner exteriorly of the fitting 28. Thus, the O-ring and the bonded joint 32 provide a double seal between the tank and the fitting 28.

A flexible diaphragm 35, formed of butyl rubber or other elastomer, is disposed inside of the lower cylindrical body 17 and is adapted to conform to the shape thereof. The diaphragm has a bead 36 on the interior surface thereof adjacent its free edge 37. The diaphragm is so situated that its free edge 37 is adjacent the upper free edge 38 of the liner 25. A concave retaining ring 40 mates with the bead 36 and anchors the upper ends of the diaphragm 35 and the liner 25 to the lower cylindrical body 17.

A conventional air check valve 42, secured in the orifice 14 in the upper cylindrical body 11, permits air under pressure to be introduced into the gas receiving section 44 between the diaphragm 35 and the upper cylindrical body. After the pressure in the section 44 is raised to the desired value, the valve is covered with a seal 46.

The expansion tank according to the present invention is assembled as follows. The fitting 28 is brazed or welded at 32 to the lower end wall 19. The plastic liner 25 is then placed on the interior surface of the lower cylindrical body 17, the orifice 26 being slipped over the lip 29. Next, the O-ring 30 is stretched over the lip 29, which is then rolled over the O-ring to compress it and the liner between the lip and the lower cylindrical body.

The bead 36 of the diaphragm 35 is stretched into position on the concave retaining ring 40. The diaphragm with the ring thereon are then placed over the liner 25. A back-up tool (not shown) is placed against the ring 40 while pressure, for example, by means of a forming roll, is applied to the outside of the side wall 18 opposite the ring, as described and illustrated more fully in my above-mentioned Pat. No. 3,035,614, to form a rib 48 thus squeezing the liner 25 and the bead 36 of the diaphragm 35 between the rib 48 and the retaining ring 40.

The upper and lower cylindrical bodies 11 and 17 are then placed together so that the edge 22 receives the offset edge 15 telescopically, and the edges are joined together by welding, brazing or soldering. The edges 15 and 22 are sufficiently spaced from the upper free edge 38 of the liner 25 that the liner and the diaphragm 35 are not damaged by heat when the edges are being joined together.

Air under pressure can be introduced through the air check valve 42 until the pressure in the gas-receiving section 44 reaches 18 pounds per square inch, for example, and the seal 46 is pressed over the valve 42 to protect it.

It will be understood that the expansion tank is susceptible of considerable modification in shape and dimensions. Accordingly, the form of the invention disclosed herein should be considered to be illustrative, and the invention should not be deemed to be limited except as it is defined in the following claims.

I claim:

1. An expansion tank comprising a hollow body having at least one side wall and an end wall, a flexible diaphragm secured to the side wall dividing the interior of the body into two sections, one of the sections being adapted to receive a liquid, and a liquid-impervious liner having an end wall and a side wall disposed in adjacent non-adhering relation to the end wall and the portion of the side wall of the body enclosing the liquid-receiving section for covering the interior surfaces of the portion of the body enclosing the liquid-receiving section, whereby the diaphragm and the liner prevent the liquid from contacting the body.

2. An expansion tank comprising a hollow body having a side wall and end walls, a liquid-impervious liner having an end wall and a side wall covering the corresponding end wall and a portion of the side wall of the body in adjacent non-adhering relation thereto, the liner having a peripheral edge portion contacting the side wall, a flexible diaphragm dividing the interior of the body into two sections, one of the sections being adapted to receive a liquid, the diaphragm having a peripheral portion disposed in overlying relation to the peripheral edge portion of the liner, and means retaining the peripheral portions of the diaphragm and the liner against the side wall to form a liquid-tight seal between the peripheral portions of the diaphragm and the liner.

3. The expansion tank according to claim 2 wherein the retaining means includes a continuous ring engaging and receiving the peripheral portion of the diaphragm, and the side wall engages the peripheral edge portion of the liner, the ring and wall having a complemental rib and groove securing the diaphragm to the side wall.

4. The expansion tank according to claim 3 wherein the diaphragm is formed with a bead on its peripheral portion, the bead being received between the rib and the groove.

5. The expansion tank according to claim 2 for use in a water system wherein one of the body walls covered by the liner is provided with a fitting for coupling the tank to the water system, the fitting including a lip portion which extends through and is received by an orifice formed in each of the one body wall and the liner, the orifices in the body wall and the liner being substantially in registry, and sealing means disposed around the lip portion of the fitting in engagement with the fitting and the portion of the liner adjacent the orifice therein for preventing the escape of water between the fitting and the liner from the water-receiving section defined by the diaphragm and the liner.

6. The expansion tank according to claim 5 wherein the outer edge of the lip portion of the fitting extends over the sealing means to compress the sealing means and the liner between the lip portion and the body wall adjacent the fitting.

7. The expansion tank according to claim 6 wherein the fitting is bonded to the exterior surface of the body wall to provide a liquid-tight seal therebetween.

8. A method of making an expansion tank comprising the steps of inserting a liquid-impervious liner having a free edge into a hollow body so as to cover a portion of the interior surface of the body, inserting a continuous ring within and in engagement with the peripheral portion of a flexible diaphragm, inserting the flexible diaphragm and the ring into the hollow body so that the peripheral portion of the diaphragm overlies the peripheral portion adjacent the free edge of the liner, and deforming inwardly the portion of the body in alignment with the ring to form an inwardly extending rib compressing the diaphragm and the liner between the ring and the rib to provide a liquid-tight seal between the diaphragm and the liner at the peripheral portions thereof.

9. A method of making an expansion tank for use with a water system comprising the steps of attaching a fitting for coupling the tank to the system to the body wall of the tank so that a lip portion extending from the fitting extends through a mating orifice in the body wall, covering a portion of the interior surface of the body wall with a liner, an orifice in the liner being slipped over the lip portion of the fitting, installing an O-ring seal over the lip portion of the fitting, rolling the lip portion over the O-ring seal to compress the seal and the liner between the lip portion and the body wall and provide a water-tight seal between the fitting and the liner, inserting a flexible diaphragm into the tank so that the peripheral portion of the diaphragm overlies the peripheral portion of the liner remote from the orifice therein, and securing the peripheral portions of the diaphragm and the liner together so as to form a liquid-tight seal therebetween.

10. The method according to claim 9 in which the fitting is bonded to the exterior surface of the body wall to provide a water-tight seal therebetween.

11. An expansion tank for use in a water system comprising a hollow body having a side wall and end walls, a flexible diaphragm dividing the interior of the body into two sections, one of the sections being adapted to receive water, a unitary water-impervious liner having an end wall and a side wall conforming to the shape of and being disposed in adjacent non-adhering relation to the end wall and the portion of the side wall of the body enclosing the water-receiving section for covering the interior surfaces of the portion of the body enclosing the water-receiving section, the side wall of the liner covering only a portion of the side wall of the body and having a peripheral edge portion contacting the body side wall, the diaphragm having a peripheral portion disposed in overlying relation to the peripheral edge portion of the liner, a continuous ring engaging and receiving the peripheral portion of the diaphragm, the ring and the adjacent portion of the body side wall having a complemental rib and groove for retaining the peripheral portions of the diaphragm and the liner side wall against the body side wall to form a water-tight seal between the peripheral portions of the diaphragm and the liner side wall, a fitting for coupling the tank to the water system mounted on one of the body walls covered by the liner, the fitting including a lip portion which extends through and is received by an orifice formed in each of the one body wall and the liner, the orifices in the body wall and the liner being substantially in registry, and sealing means disposed around the lip portion of the fitting in engagement with the fitting and the portion of the liner adjacent the orifice therein for preventing the escape of water between the fitting and the liner from the water-receiving section defined by the diaphragm and the liner, the outer edge of the lip portion of the fitting extending over the sealing means to compress the sealing means and the liner between the lip portion and the body wall adjacent the fitting, whereby water-tight seals are provided between the diaphragm and the liner and between the liner and the fitting to positively seal the water-receiving section of the tank.

References Cited

UNITED STATES PATENTS

| | | | |
|---|---|---|---|
| 2,450,173 | 9/1948 | Uhri | 285—204 |
| 2,475,007 | 7/1949 | Carlson | 285—204 |
| 3,035,614 | 5/1962 | Kirk | 138—30 |
| 3,067,810 | 12/1962 | Mozic | 138—30 X |
| 3,137,317 | 6/1964 | Peters | 138—30 |
| 3,165,229 | 1/1965 | Paul | 138—30 X |
| 3,297,056 | 1/1967 | McLaughlin et al. | 138—145 |
| 3,376,898 | 4/1968 | Hugley | 138—30 X |

LAVERNE D. GEIGER, Primary Examiner

H. K. ARTIS, Assistant Examiner